No. 11,824.

Reissued Apr. 24, 1900

D. M. STEWARD.

TIP FOR GAS BURNERS.

(Application filed Dec. 12, 1899.)

Attest

C. Middleton

Finis D. Morre

Inventor

D. M. Steward by Ellis Spear

Atty.

UNITED STATES PATENT OFFICE.

DEMETRIUS M. STEWARD, OF CHATTANOOGA, TENNESSEE.

TIP FOR GAS-BURNERS.

SPECIFICATION forming part of Reissued Letters Patent No. 11,824, dated April 24, 1900.

Original No. 635,818, dated October 31, 1899. Application for reissue filed December 12, 1899. Serial No. 740,068.

*To all whom it may concern:*

Be it known that I, DEMETRIUS M. STEWARD, a citizen of the United States, residing at Chattanooga, Hamilton county, Tennessee, have invented certain new and useful Improvements in Tips for Gas-Burners, of which the following is a specification.

My invention relates to tips for gas-burners, and is intended especially to be used in the burning of acetylene gas.

My object is to produce a clear white light without the production of smoke or carbon, and instead of using a single flame with each tip or a single union-jet I so construct my tip as to use two or more single flames or two or more union-jets, thus increasing the lighting capacity of each tip and at the same time providing for a perfect admixture of the gas and air.

Figure 1:
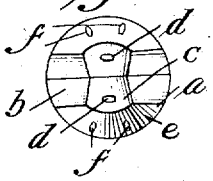
Figure 3:
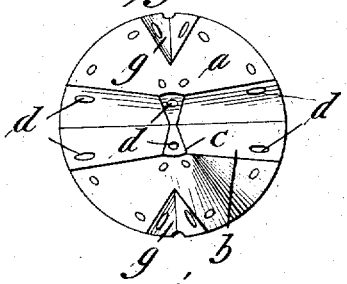
Figure 2:
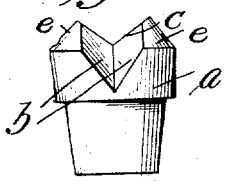
Figure 4:
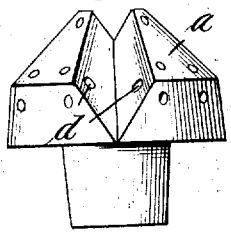
Figure 5:
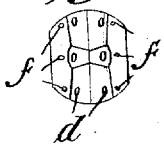
Figure 7:
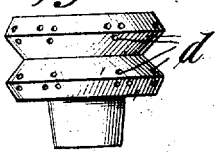
Figure 6:
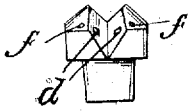

In the accompanying drawings I have shown my invention in Figures 1 and 2 in a plan and a side view, this illustrating the simplest form of tip. Figs. 3 and 4 show a modified form. Figs. 5, 6, and 7 show further modifications.

In the figures the tip *a* is made with a valley-shaped recess or depression extending centrally of the tip from side to side, this valley being arranged, preferably, at an angle from the side to near the center and then extending horizontally directly across the center. The side valleys are shown at *b* and the center valley at *c*. This form of valley is not absolutely essential, however, as in Figs. 5 and 6 I have shown a tip with substantially only the side valley, these valleys meeting at the center of the tip. I preferably use what are known as "union-jet openings," and in Fig. 1 I have shown these openings *d* as made in the center walls of the valleys, extending at an angle to each other, and this angle is such that the flame does not seat itself on the material of the tip, and thus prevents the formation of carbon; but the jets merge into one above the position of the top of the tip. The tip is provided with inclined portions *e* in rear of the central gas-openings, and these portions are perforated at *f* to connect with the main gas-openings, as shown. A ridge divides the main gas-opening *d* from the openings *f* in the inclined portion *e*, and these peripheral openings *f* may be arranged in pairs, as shown, or one or more of them may be used.

In Figs. 5 and 6 a tip is shown with the central valley, and instead of having a single union-jet, as in Fig. 1, a series of them are used, these being arranged in pairs *d* at the center of the tip and at each end of the valley, while upon the inclined surface of the tip, extending parallel of the valley, smaller openings *f* are provided, which communicate with the valley-jets.

In Figs. 3 and 4 a further modification is shown, and in addition to the central valley with the pairs of union-jets *d* a valley *g* is formed on each periphery on a line extending at right angles with the central valley, and these valleys are also provided with jet-openings. The conical surface of the tips is provided with small openings communicating with the union-openings, and a series of like openings are also used around the outer periphery of the tip.

While I have shown the valley as of V shape, I do not limit myself in this connection, as I may use a groove instead of a different shape.

By using in one burner two or more pairs of union-jets in a fixed relative position to each other, which it is very difficult to do where there is a separate holder for each jet, and by arranging the jets in series all on a single tip the burners are not likely to be broken by any ordinary handling, and while the tips as now made are limited to a single flame burning not more than one foot of gas per hour my improved tip can be utilized for any number of flames desired from one-fourth of a foot each up to one foot capacity per hour.

In Fig. 7 I have shown a further modification in which instead of arranging the valley across the top of the tip I locate the valley around the periphery, and this makes a very useful type of burner for large places—railroad-stations, halls, lighthouses, and for street-lights.

What I claim is—

1. A tip for gas-burners having a V-shaped valley therein, a plurality of union-jet openings disposed along the walls of the valley and discharging transversely thereof, substantially as described.

2. A tip for gas-burners having an elongated valley therein, a plurality of union-jet openings disposed along the length of the valley discharging transversely of the same, substantially as described.

3. A gas-tip having a valley therein with union-jet openings leading from the walls thereof, and reversely-inclined walls outside of said valley having openings therein.

DEMETRIUS M. STEWARD.

Witnesses:
E. W. CRUMP,
A. CANFIELD.